United States Patent Office 3,783,111
Patented Jan. 1, 1974

3,783,111
GOLD PLATING BATH FOR BARREL PLATING OPERATIONS

Maurice Bick, South Orange, and Jean A. Lochet, Metuchen, N.J., assignors to Auric Corporation, Newark, N.J.

No Drawing. Continuation-in-part of application Ser. No. 273,860, July 21, 1972. This application Sept. 11, 1972, Ser. No. 288,020
The portion of the term of the patent subsequent to Dec. 26, 1989, has been disclaimed
Int. Cl. C23b 5/28
U.S. Cl. 204—46 14 Claims

ABSTRACT OF THE DISCLOSURE

An electroplating bath particularly suited for barrel plating operations. The bath includes in addition to an alkali-gold cyanide, a soluble salt of one or more chelating aminopolycarboxylic acids, with quantities of hydrazine, and small amounts of arsenic and/or lead ion.

This application is a continuation-in-part of our copending applications, Ser. No. 273,860, filed July 21, 1972, for "Gold Plating Bath for Barrel Plating Operations" and Ser. No. 176,334, filed Aug. 30, 1971, now U.S. Pat. No. 3,716,463, for "Bright Gold Electroplating Bath," which applications are assigned to the same assignee as the instant application.

BACKGROUND OF INVENTION

This invention relates generally to electroplating baths, and more specifically relates to such baths as are useful in barrel gold plating operations.

Gold, within recent years, has become a very important part of the electronics industry. Among those properties recommending its use are its relative inalterability, high solderability, and low contact resistance. In the semiconductor field, gold has furthermore found favor because of its ability to readily form a eutectic alloy with silicon and germanium.

In the latter connection, it may be noted that most headers or packages for diodes, transistors, and integrated circuits are gold plated as a preparation for the mounting or attaching of the semi-conductor devices. For such an application, the gold deposit must be of high purity and deposited as uniformly as possible, in order to readily alloy with silicon or other metallic contacts. The problem of plating such parts is compounded by the fact that these components are irregularly shaped and of complicated design. Such parts are exemplified by the well-known line of TO–5 and TO–8 multi-lead headers. Such headers consist of an eyelet of Kovar metal to which several insulated Kovar leads are attached and sealed in glass.

In accordance with known principles in the art, headers of the foregoing type have in the past been plated (among other methods) by so-called barrel plating techniques—that is, by subjecting such articles to electroplating while a plurality of articles tumble in a barrel. When such articles are thus plated, however, it is found that many leads do not make electrical contact with the remainder of the load. Where such condition obtains during the plating cycle, the portion of the lead closest to the anode becomes cathodic. Such leads become bipolar, and at the anodic portions of the leads problems can arise in that (a) the gold may redissolve anodically; and (b) the base metal can be attacked to expose bare spots—especially where the plating solution includes high concentrations of citrates or phosphates. Should the tumbling action be markedly inadequate, these problems can become quite severe. In the past these problems have partially been overcome by incorporating mechanical means for improving the electrical conductivity through the load. Such means have taken the form of metal particles or metal shot. Unfortunately, during the plating operation, the shot itself becomes gold-plated, resulting in loss of gold and attendant increase in the cost of plating the desired objects—i.e. the headers, etc.

In our above-cited co-pending application Ser. No. 273,860, we have disclosed our finding that an alkali-gold cyanide electroplating bath including a chelating phosphonic acid, with additional quantities of hydrazine and small amounts of arsenic and/or lead ion, eliminates or minimizes many of the cited problems, and in fact provides superior performance in the aforementioned barrel plating operations. The said baths, however, are in at least one important commercial respect less than satisfactory: we refer to the fact that the phosphonic acid compounds identified therein are relatively expensive, which tends to inhibit the otherwise advantageous use thereof.

In the above connection it is pointed out that it has long been known (see for example U.S. Pat. No. 2,724,-687) that certain of the chelating aminopolycarboxylic acids, such as, for example, ethylene diamine tetra acetic acid (EDTA) are excellent chelating agents for use in gold plating. These compounds, furthermore, in comparison particularly to the phosphonic acid compounds mentioned above, are relatively inexpensive. Unfortunately, however, the use of these compounds has, in the past, been sharply limited by the fact that they lack stability under anodic oxidation. In consequence of this, decomposition products have tended in the past to form in gold plating baths in which such materials are employed, with resultant contamination of the bath, or of the deposit. In order to rectify such condition it has, in the past, been required to regularly remove the decomposition products, as, for example, by means of activated charcoal, or the like. See, for example, the discussion of such decomposition phenomenon at page 125 of Fischer and Weimer, Precious Metal Plating (Robert Draper, Ltd., Teddington, 1964). This phenomenon in turn has compounded the operating procedures and produced attendant cost and loss of operating time.

In accordance with the foregoing it may be regarded as an object of the present invention to provide electroplating bath compositions for use in barrel plating operations, which are highly effective in reducing effects of bipolarity.

It is a further object of the invention, to provide gold electroplating baths, for use in the barrel floating of electronic components or the like, which baths display reduced tendencies to attack the base metal of the said components.

It is another object of the invention, to provide gold electroplating baths, especially suited for use in barrel plating of electronic components or the like, which prevent or slow down co-deposition with the gold of the troublesome common impurities such as copper, nickel, cobalt, iron and lead.

It is a further object of the invention to provide gold electroplating baths enabling improved metal distribution and superior aesthetic properties in the resultant platings.

It is a still further object of the invention to provide gold electroplating baths which incorporate relatively inexpensive chelating aminopolycarboxylic acids and the soluble salts thereof, and which incorporate additional agents which act to prevent the formation of undesirable decomposition products in consequence of anodic oxidation.

SUMMARY OF INVENTION

Now in accordance with the present invention, it has unexpectedly been discovered that the foregoing and other objects are achieved in an electroplating bath which includes in addition to an alkali-gold cyanide, a soluble salt of one or more chelating aminopolycarboxylic acids (or as appropriate the acids themselves), together with quantities of hydrazine and small amounts of arsenic and/or lead ion. The said combination in addition to eliminating or minimizing many of the cited problems previously found to exist during barrel plating operations, also by virtue of its use of the cited chelating agents enables formulations at relatively low cost. The cited chelating agents appear to function in the present environment to reduce the tendency of the compositions to attack the base metal, and by virtue of their chelating characteristics slow down or prevent co-deposition with the gold of the common impurities, such as copper, nickel, cobalt, iron and lead.

The electrolyte is kept slightly on the reducing side by the addition of the reducing agent, hydrazine. Such agent appears in the combination of the invention to greatly reduce or even eliminate the aforementioned tendency to anodic deplating of the parts being processed. Furthermore, for reasons that are not completely understood, the hydrazine, in the present composition acts to improve the throwing power of the bath.

Additionally, as will be discussed in greater detail hereinbelow, a synergistic effect appears to occur in the present bath between the chelating agents and hydrazine, which acts to stabilize the present bath, well beyond that which might be anticipated on the basis of the individual components. One of the consequences of such synergistic effect appears to be a marked reduction in the tendency of the chelating agents to anodically oxidize. As a result decomposition products are maintained at minimal levels.

The trivalent arsenic ion and/or lead ion serve in the present environment to augment the smoothness of the deposit, yielding platings of superior aesthetic qualities, such as with respect to lustre and color thereof. The addition of as little as .4 mg. of $As^{+++}$ or 2 mg. of $Pb^{++}$ per liter of solution, refines the grain of the deposit and provides an attractive pale yellow semi-bright gold deposit of attractive lemon-yellow color and of low porosity. For reasons that are not completely understood these additives appear in the environment of barrel plating operation, to greatly improve the resulting metal distribution.

DESCRIPTION OF PREFERRED EMBODIMENT

Among the chelating agents which may be utilized in the baths of the present invention are the bath soluble salts of: ethylenediamine tetra acetic acid (EDTA); trans-1,2-diaminocyclohexane tetra acetic acid (CDTA), available as the monohydrate from Geigy Chemical under the trademark "Chel-CD"; nitrilo triacetic acid (NTA); diethylene triamine penta acetic acid (DTPA); hydroxyethylethylene diamine tetra acetic acid (HOEDTA), available from Geigy Chemical under the trademark "Chel-DM"; and diaminoethylether tetra acetic acid, available from Geigy Chemical under the designation "Chel-ME." The acids themselves, as opposed to the salts thereof, may also be used where suitable solubility is exhibited by such materials, or combinations of the salts and acids may be utilized in desired formulations.

The cited chelating agents are present in the baths of the present invention in a preferred concentration range of from about 60 to 320 g./l. All of the compounds cited exhibit high stability constants, in particular exhibiting relatively high pK values with respect to chelated metallic impurities, such as for example, copper, nickel, cobalt, iron, etc. However, the EDTA is particularly advantageous for use in the present compositions, in consideration of the relatively low cost and availability of such compound. If the said compound is compared, for example, with the specified CDTA, the latter is considerably more resistant than EDTA; and it is found that the cited decomposition problems (under anodic oxidation) are not as acute with respect to the latter compound. However, the cost of the CDTA is far higher than that of EDTA, and for such reason its use in the past has been rather limited. In accordance with the present invention, however, the tendency of EDTA to decompose under anodic oxidation may be so sharply diminished as to enable use of EDTA by itself in the compositions to be set forth; or alternatively optimized combinations of EDTA and CDTA, such as provide at reasonable cost both high chelating abilities and also the absence of decomposition products, may be achieved.

Examples 1–3

A series of three gold electroplating baths were prepared in accordance with the present invention, incorporating the following components:

| | Bath 1 | Bqth 2 | Bath 3 |
|---|---|---|---|
| EDTA acid, g./l | 75 | 150 | 150 |
| EDTA $Na_4$, g./l | 120 | | |
| Hydrazine 64%, ml./l | 25 | 25 | 25 |
| Au, g./l | 8 | 8 | 2 |
| AS, +++mg./l | 2 | | 1a |
| pH adjusted to | 7.0 | 71.0 | 4.5 |
| KOH to pH | | 7.0 | 4.5 |

All of the three baths cited above were operated at 50° C. and at current densities of 5 a.s.f., and were found to be highly suitable for barrel plating of parts such as the cited TO–5 headers. Bath 2 is a preferred formulation; Bath 3 is particularly useful as a strike bath, but is somewhat less stable by virtue of its lower pH.

In place of, or in addition to the $As^{+++}$ ion, it has been found that small quantities of $Pb^{++}$ ion may be utilized, with consequent marked improvement in the properties of the deposit—including refinement of grain, production of porosity, and better metal distribution. Resultant improvement of aesthetic qualities, such as lustre and color is similarly evidenced. Where lead is used alone as little as 2 mg./l. are thus effective (calculated as the metal), with the useful range of addition extending up to about 12 mg./l. The lead may be in the form of bath soluble salts, such as lead nitrate and lead acetate. It may be observed in connection with the present results that it is quite unexpected in view of the fact that lead ion acts as a most undesirable impurity in pure gold deposits plated from citrate or phosphate-citrate systems.

Examples 4–5

| | Bath 4 | Bath 5 |
|---|---|---|
| CDTA, g./l | 150 | 120 |
| Hydrazine 64%, ml./l | 25 | 25 |
| KOH to pH | 7.0 | 4.3 |
| Au, g./l | 8 | 3 |
| As +++, mg./l | 1 | 1 |
| pH adjusted to | 7.0 | 4.5 |

The CDTA cited for Examples 4 and 5 is the "Chel-CD" material available from Geigy Chemical, as above indicated. Both of the baths cited above were found to be extremely suitable for barrel plating operations when operated at 50° C. and current densities of 5 a.s.f. The gold cited for use in all of the foregoing examples is calculated as the metal and is added to the compositions preferably as a standard 68% P.G.C. (potassium gold cyanide) solution. Other alkali-gold cyanide solutions, such as sodium, or ammonium gold cyanide solutions may be used. As metallic gold, the element may be present in the approximate range of from about 2 g./l. to saturation, with a practical upper limit being about 32 g./l. The hydrazine 64% (hydrazine hydrate) is a product available from Fairmount Chemical Co., Newark, N.J. Said hydrazine 64% may be present in the bath in the approximate range of from 5 ml./l. to 100 ml./l., or somewhat higher. In preparing the bath several components are added to the bath in the order indicated, with sufficient water being added to provide one liter of solution. The preferred concentration of hydrazine (calculated as 64% hydrazine) is about 25 ml./l. for typical applications, such as where headers like the TO–5 and TO–8 are plated. Concentrations substantially beyond this level yield little additional benefits.

The baths of the invention are typically used at a pH of about 7.0. Good results are achieved with pHs as low as 4.0, but a preferred operating range is from about 6.0 to 8.0. Typical operating temperatures are from about 90° F. to 130° F., with a preferred operating range being from about 120° to 125° F.

As has been pointed out previously, combinations of EDTA and CDTA may be formulated in order to provide optimized results from both a technical and economic viewpoint. Example 6 below sets forth such a bath.

Example 6

| | | |
|---|---|---|
| EDTA | g./l. | 140 |
| CDTA | g./l. | 10 |
| KOH | g./l. | 52 |
| Hydrazine 64% | ml./l. | 25 |
| As+++ | mg./l. | 1 |
| Au | g./l. | 8.2 |

pH adjusted to 7.0.

The said bath was operated at 50° C. and at a current density of 5 a.s.f. in the plating of a test panel. After 20 minutes the said panel was plated with a lustrous gold deposit of a pleasing yellow color. The efficiency was found to be 128 mg./amp-min.

Maximum increased stability of baths in accordance with the invention are achieved in the pH range of 6.0 to 8.0. It will be appreciated by those skilled in the art that such result is unexpected as the reducing abilities of hydrazine would normally be anticipated to increase with increasing pH, especially in the alkaline range between 7.0 and 8.0. This point is well illustrated by the Bath 3 set forth above. Such bath is very useful, and is a preferred strike bath to precoat TO–5 and TO–8 multi-lead headers, by virtue of its pH of 4.5—which is necessary to provide adhesion on Kovar and similar related alloys. (Baths at pH 6 to 8 do not normally provide good adhesion over Kovar and other ferrous alloys.) The efficiency of the Bath 3 is about 122 mg./amp-min. at 50° C., and with current densities of 5 a.s.f. The stability of the bath with a pH of 4.5 is much less than that of the preferred bath at pH of 6.0 to 8.0. In particular the gold slowly plates out on the side of the tank heaters, anodes, etc. The bath performs satisfactorily provided the gold content is maintained above about 2 g./l.—with the other components being in the range otherwise specified for the invention. However, the bath has a much shorter life and must be changed more often, in contrast to which the baths having pHs of about 6.0 to 8.0 and temperatures of about 50° C., have unlimited life and need be changed only when the level of contaminants (especially organics) becomes excessive.

The action of the hydrazine in the present bath appears to be much more than that of a mere reducing agent. Rather it appears that a synergistic action occurs by virtue of the combination of the chelating agent, such as the cited EDTA, with the hydrazine. Thus, it is observed that the cited combinations stabilize the baths well beyond what might be anticipated in the absence of synergistic effects—since gold plating baths with large concentrations of hydrazine are normally destroyed during electrolysis. This aspect of the invention is illustrated by comparing the data for the bath of Example 7 below with the data cited in connection with bath 2, above. These two baths, while both utilizing hydrazine, differ with respect to the acid additive.

Example 7

A bath was prepared as follows:

| | | |
|---|---|---|
| Gold (as P.G.C.) | g./l. | 8 |
| Monosodium phosphate | g./l. | 50 |
| Citric acid | g./l. | 110 |
| Hydrazine 64% | m./l. | 100 |
| As+++ | mg./l. | 2 |
| pH adjusted to 7.0. | | |
| Temperature | ° C. | 50 |

A panel was plated at .4 amp/sq. decimeter in the above solution and was acceptable with a pleasing lemon-yellow color. Efficiency was found to be 127.6 mg./amp-min. (which indicates an electroless action since the maximum efficiency for a gold-plating solution is 122.6 mg./amp-min.). The said bath was stable overnight, but after a few days of standing at room temperature the bath broke down and the gold started to precipitate out. In contrast to this bath 2 was found to be stable and continued to be stable for several weeks.

Phosphate ion can be added to the baths of the present invention to adjust the conductivity and/or the pH. The said ion may be typically added in excess and any alkali phosphate is useful, although preferably potassium diphosphate is so utilized. A typical formulation is illustrated in Example 8 below.

Example 8

| | | |
|---|---|---|
| Potassium diphosphate | g./l. | 150 |
| EDTA | g./l. | 100 |
| As+++ | mg./l. | 1 |
| Gold | g./l. | 1 |
| Hydrazine | ml./l. | 25 |

The said bath set forth in this example displays a pH of approximately 7.1.

Further in accordance with the present invention, it has been found that addition of quantities of cyclohexylamine to baths of the foregoing type are useful in adding additional stability to the said baths.

Example 9

| | | |
|---|---|---|
| Monopotassium phosphate | g./l. | 150 |
| CDTA | g./l. | 100 |
| Hydrazine | ml./l. | 25 |
| Cyclohexylamine | ml./l. | 25 |
| Gold | g./l. | 3 |
| pH | | 4.3 |
| Plating temperature | ° C. | 50 |
| Current density | a.s.f. | 5 |

The bath cited is found to possess a very high chelating ability. Addition of as little as 1 mg. of arsenic per liter is found to provide a very pleasing lemon-yellow color in the ensuing plating; it is of interest, however, to note that the chelating ability of the said bath is so high that even with arsenic at levels as high as 8 to 16 mg./l., satisfactory results are still achieved. The bath cited, as is evident from its pH, is particularly suitable for strike purposes. Baths of this general type are normally quite difficult to stabilize over extended period; in contradistinction the bath of this example is found to be stable over extended time durations. A preferable range of addition for the cyclohexylamine is in the approximate range of from about 1 to 50 ml./l.

While the present invention has been particularly set forth in terms of specific embodiments thereof, it will be understood in view of the instant disclosure, that numerous variations upon the invention are now enabled to those skilled in the art. The compositions set forth, for example, while being particularly adapted for use in barrel plating operations, also find application in other plating environments, as for example in rack or still plating operations, where it is chiefly the distribution of metal which is of concern. Accordingly the invention is to be broadly construed, and limited only by the scope and spirit of the claims now appended hereto.

We claim:

1. An electroplating bath for barrel plating of gold, comprising: an aqueous solution of alkali-gold cyanide, said gold being in concentrations of from about 2 g./l. to saturation calculated as the metal; from 60 to 320 g./l. of a chelating agent selected from the group consisting of the bath soluble aminocarboxylic acids and bath soluble salts thereof; from about 5 ml. to 100 ml./l. of hydrazine calculated at 64% hydrazine; and as an agent for improving the distribution and aesthetic qualities of the deposit, one or more agents selected from the group consisting of arsenic and lead ion, said ion being in concentrations of less than 12 mg./l., and in sufficient quantity to provide a smoother and more evenly distributed deposit than is obtained in the absence thereof; and the pH of said bath being between 4.0 and 8.0.

2. A composition according to claim 1, wherein the pH of said composition is maintained at between 6.0 and 8.0.

3. A composition according to claim 2, wherein said chelating agent is selected from one or more members of the group consisting of ethylenediamine tetra acetic acid, trans-1,2-diaminocyclohexane tetra acetic acid, diethylene triamine penta acetic acid, hydroxylethylethylene diamine tetra acetic acid, nitrilo triacetic acid, diaminoethylether tetra acetic acid, and the bath soluble salts of said acids.

4. A composition according to claim 3 wherein said agent is selected from one or more members of the group consisting of ethylenediamine tetra acetic acid, trans-1,2-diaminocyclohexane tetra acetic acid, and the bath soluble salts of said acids.

5. A composition according to claim 3, wherein said agent comprises one or more members of the group consisting of ethylenediamine tetra acetic acid and the bath soluble salts thereof.

6. A composition according to claim 3, wherein said ion agent comprises $As^{+++}$ in a concentration range of from about .4 to 12 mg./l.

7. A composition according to claim 3, wherein said ion comprises $Pb^{++}$ in a concentration range of from about 2 to 12 mg./l.

8. A composition according to claim 1, further including added phosphate ion for adjusting the conductivity or pH of said bath.

9. A method for improved gold electroplating of complex-shaped metallic articles comprising: subjecting said article to electroplating in a barrel-type operation utilizing as an electroplating bath an aqueous solution of an alkali-gold cyanide, said gold being in concentrations of from about 2 g./l. to saturation calculated as the metal; from 60 to 320 g./l. of a dissolved chelating agent selected from the group consisting of the chelating aminocarboxylic acids and the bath soluble salts of the said acids; as an agent for reducing bipolarity effects, from about 5 ml. to 100 ml./l. of hydrazine calculated as 64% hydrazine; and as an agent for improving the distribution and aesthetic qualities of the deposit, less than 12 mg./l. of an ionic agent selected from the group consisting of arsenic and lead ion, said ion being present in sufficient quantity to provide a smoother and more evenly distributed deposit than is obtained in the absence thereof; and the pH of said bath being between 4.0 and 8.0.

10. A method according to claim 9, wherein the pH of said bath is maintained between about 6.0 and 8.0.

11. A composition according to claim 10, wherein said chelating agent as selected from one or more members of the group consisting of ethylenediamine tetra acetic acid, trans-1,2-diaminocyclohexane tetra acetic acid, and the bath soluble salts of said acids.

12. A method in accordance with claim 11, wherein said plating operation is conducted at temperature of from about 120° to 125° F.

13. A method in accordance with claim 11, wherein said ion agent comprises $As^{+++}$ in the concentration range of from about .4 to 12 mg./l.

14. A method in accordance with claim 11, wherein said ion agent comprises $Pb^{++}$ in a concentration range of from about 2 to 12 mg./l.

References Cited

UNITED STATES PATENTS

| | | | |
|---|---|---|---|
| Re. 25,883 | 10/1965 | Duva et al. | 204—43 G |
| 3,666,640 | 5/1972 | Smith | 204—44 |
| 3,380,898 | 4/1968 | Danemark et al. | 204—44 |
| 2,841,611 | 7/1958 | Bersworth | 260—502.5 |
| 3,669,852 | 6/1972 | Winters | 204—46 |

GERALD L. KAPLAN, Primary Examiner

U.S. Cl. X.R.

204—43 G